H. DECH.
INNER TUBE AND METHOD OF AND APPARATUS FOR MAKING THE SAME.
APPLICATION FILED AUG. 14, 1918.

1,340,703.  Patented May 18, 1920.

Inventor:
Henry Dech
by his attorney
Brock Seward

UNITED STATES PATENT OFFICE.

HENRY DECH, OF TRENTON, NEW JERSEY, ASSIGNOR TO MERCER TIRE COMPANY, OF TRENTON, NEW JERSEY, A CORPORATION OF NEW JERSEY.

INNER TUBE AND METHOD OF AND APPARATUS FOR MAKING THE SAME.

1,340,703.

Specification of Letters Patent.   Patented May 18, 1920.

Application filed August 14, 1918. Serial No. 249,809.

*To all whom it may concern:*

Be it known that I, HENRY DECH, a citizen of the United States, and resident of Trenton, in the county of Mercer and State of New Jersey, have invented a new and useful Improvement in Inner Tubes and Methods of and Apparatus for Making the Same, of which the following is a specification.

This invention relates to a rubber inner tube for pneumatic vehicle tires and to a method and apparatus for the manufacture of the same, with the particular object in view of providing an inner tube which can have any desired reinforcement or thickness as to its tread portion or outer periphery.

Another object consists in providing a method and apparatus whereby tubes of such character may be expeditiously manufactured and the material of which the tube is composed vulcanized in substantially the same shape as that in which it is to be used.

Up to the present time it has been the general custom to manufacture inner tubes for pneumatic vehicle tires on either straight or spiral cores or mandrels. These tubes are commonly very thin and of a uniform thickness throughout. They serve as airtight containers for the air which gives the tire its pneumatic character, and their rupture by direct puncture or by abrasion, results in the deflation of the tire as a whole. It has been found that one of the most frequent causes of deflation is the cracking or breaking of the fabric which constitutes the inside of the outer shoe or casing, which cracking or breaking raises a ridge which gradually chafes through the comparatively thin tube.

Furthermore, any small, sharp article which manages to penetrate the outer shoe or casing of the tire will rapidly wear through the ordinary tube, and when even a small hole is formed in the casing, the air pressure within the tube will force the wall of the inner tube therethrough and burst it. To obviate these disadvantages it has been suggested to either reinforce the outer portion of the tube with metal, fabric, etc., or to make that portion of the tube relatively thick. These suggestions have been found to be impractical when the tubes were made on straight or spiral mandrels and by methods now in common use.

My invention overcomes the difficulties mentioned and enables the rapid and satisfactory manufacture of inner tubes with thickened tread portions reinforced in any desired and practical manner to withstand wear.

A practical embodiment of my invention and of one form of apparatus which is adapted for carrying out my improved method is shown in the accompanying drawings in which,—

Figure 1:
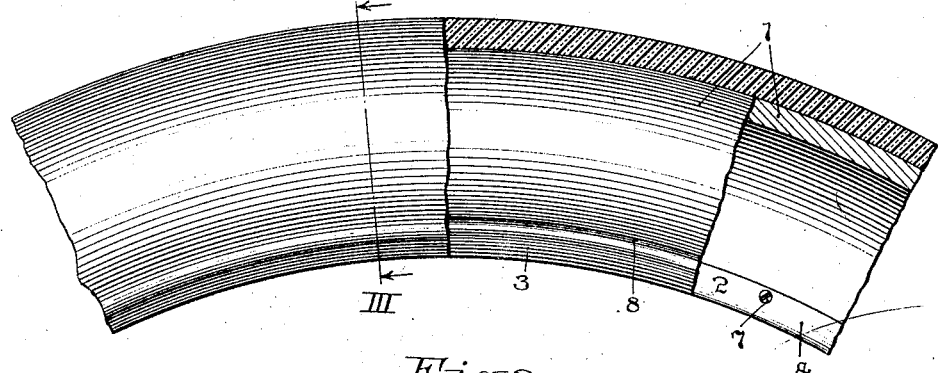
Figure 1 represents a side elevation, partly broken away, of a portion of the core or mandrel on which the tube is built and vulcanized, the tube being shown in position thereon.
Figure 2:
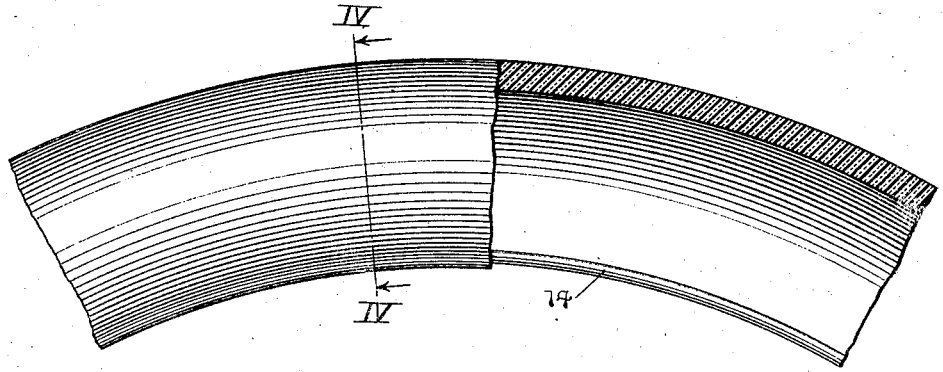
Fig. 2 represents a side elevation of the finished tube, partly broken away to show the details of the structure.

The core 1 on which the tube is built up, is in the form of an annulus having a circumferential gap 2 in its inner wall. A pair of molding rings 3 and 4 are located adjacent to the gap 2 and extend outwardly from the gap a short distance along the outer face of the core and spaced therefrom. The rings 3 and 4 are provided with angularly extending shoulders 5 and 6 which abut the end walls of the core and are securely fastened thereto by screws 7.

The molding ring 3 on one side of the gap is in the form of a tongue having an enlarged portion at its end which lies opposite a groove 8 formed in the core. The ring 4 on the other side is of such a shape as to form, with the outer surface of the core, a recess terminating in an enlarged opening or chamber of substantially the same size as the enlarged portion on the said tongue, which chamber is formed by complementary grooves 9 and 10 in the core 1 and ring 4 respectively. These molding rings may be made of metal, such as steel, or of hard vulcanized rubber and fabric.

Figure 3:
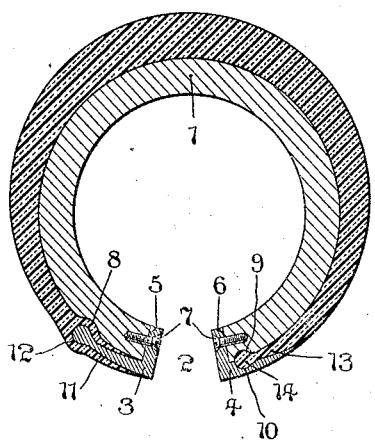
Fig. 3 represents an enlarged section taken in the plane of the line III—III of Fig. 1, looking in the direction of the arrows.
Figure 4:
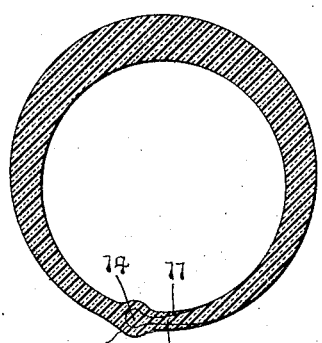
Fig. 4 represents an enlarged section taken in the plane of the line IV—IV of Fig. 2, looking in the direction of the arrows.

The tube is built up on the core in a manner and of materials well known to those skilled in the art, and the rings 3 and 4 placed in position, as shown in Fig. 3.

The molding ring 3 will form in one edge of the tube a slit 11 with an enlarged chamber 12 at its bottom and the strip 4 will form the other edge of the tube into a tongue 13 having an enlarged bead 14 at its end.

The tube having been built up on the core 1 and its folding rings 3 and 4, as described, it is then wound spirally with fabric and vulcanized in a manner well known to those skilled in the art. After the vulcanization is finished the tape is removed and the tube stripped from the core. To facilitate the removal of the tube, one or both of the molding rings 3 and 4 may be first detached from the core by removing the screws 7. If desired, the rings 3 and 4 may be coated with some substance, such as talc, to prevent them from adhering to the tube as a result of the vulcanization.

Quick vulcanizing rubber cement is now applied to the tongue 13 and its bead 14, and the tongue 13 is inserted into the slit 11 to a point where the bead 14 is seated in the chamber 12. The joint thus formed is then subjected to vulcanizing heat for a period sufficient to cure the cement and thus the edges of the tube are securely and permanently fastened together and the tube made air-tight. If desired, the slit 11 may be luted with the cement in addition to or in place of the coating of the tongue 13.

For the step of vulcanization the tube may be lightly inflated, say to about ten pounds air pressure, if desired. A suitable valve may be built into the tube in a manner well understood by those skilled in the art.

The tube is now complete and may be used in the ordinary manner.

It will be observed that, by the above method, the tube is completely built and vulcanized in substantially the shape in which it is to be used and that the uniting of the edges of the tube does not require any appreciable distortion of the tread portion or walls.

It will be seen that the tube may be made of any desired thickness and may be reinforced with any suitable or convenient materials for the purpose of strengthening it.

I desire it to be understood that various changes may be resorted to in the form, construction and arrangement of the tube and of the apparatus used in carrying out the method of manufacturing it, and in the particular manner of conducting the steps of the method and in the order thereof, without departing from the spirit and scope of my invention; and hence I do not intend to be limited to the details herein shown and described except as they are specifically included in the claims.

What I claim is:

1. Method of making an inner tube comprising the following steps: first, building up on an open bellied core a tube having a slit in one of its edges and a projecting tongue on its other edge; second, vulcanizing the tube; third, removing the tube from the core; and finally sealing the opening in the belly of the tube by inserting the tongue into the slit.

2. Method of making an inner tube comprising the following steps: first, building up on an open bellied core a tube blank having a slit in one of its edges provided with an enlarged chamber and a projecting tongue on its other edge having an enlarged bead; second, vulcanizing the tube blank; third, removing the tube blank from the core; and finally, sealing the opening in the belly of the tube blank by inserting the tongue into the slit so that the bead on the tongue rests in the enlarged chamber of the slit.

3. A tube having a thickened tread portion and a permanent joint around its inner periphery, one of the edges of the tube blank forming said joint being provided with a tongue having a bead at its end and the other edge being provided with a slit having an enlarged opening in which the bead rests.

4. Apparatus for making inner tubes comprising, an open bellied core provided with rings at its edges, one of said rings being designed to form a slit in the tube blank and the other ring being designed to form a tongue on the tube blank.

5. Apparatus for making inner tubes comprising, an open bellied core provided with rings at its edges, one of said rings having an enlarged portion whereby it is adapted to form a slit in the tube blank having an enlarged chamber, and the other ring having a recess whereby it is adapted to form a tongue having an enlarged bead on the tube blank.

6. Apparatus for making inner tubes comprising, an open bellied core provided with rings at its edges, one of said rings having an enlarged portion whereby it is adapted to form a slit in the tube blank having an enlarged chamber, and the other ring having a recess whereby it is adapted to form a tongue having an enlarged bead on the tube blank, the core being provided with grooves one of which is opposite the said enlarged portion of one of said rings and the other of which is opposite the said recess of the other ring.

In testimony, that I claim the foregoing as my invention, I have signed my name this 24th day of July, 1918.

HENRY DECH.